(12) United States Patent
Miko et al.

(10) Patent No.: US 12,337,385 B2
(45) Date of Patent: Jun. 24, 2025

(54) METHOD FOR LASER BEAM ADDITIVE MANUFACTURING OF A MECHANICAL PART WITH TECHNICAL AND/OR DECORATIVE FUNCTION AND MECHANICAL PART WITH TECHNICAL AND/OR DECORATIVE FUNCTION

(71) Applicant: The Swatch Group Research and Development Ltd, Marin (CH)

(72) Inventors: Csilla Miko, Essertines-sur-Yverdon (CH); Anaïs Brait, Moutier (CH)

(73) Assignee: The Swatch Group Research and Development Ltd, Marin (CH)

( * ) Notice: Subject to any disclaimer, the term of this patent is extended or adjusted under 35 U.S.C. 154(b) by 853 days.

(21) Appl. No.: 17/619,873

(22) PCT Filed: Jun. 9, 2020

(86) PCT No.: PCT/EP2020/065925
§ 371 (c)(1),
(2) Date: Dec. 16, 2021

(87) PCT Pub. No.: WO2020/254145
PCT Pub. Date: Dec. 24, 2020

(65) Prior Publication Data
US 2022/0410269 A1  Dec. 29, 2022

(30) Foreign Application Priority Data

Jun. 19, 2019 (EP) ..................................... 19181282

(51) Int. Cl.
*B22F 10/28* (2021.01)
*B22F 10/36* (2021.01)
(Continued)

(52) U.S. Cl.
CPC .............. *B22F 10/28* (2021.01); *B22F 10/36* (2021.01); *B22F 10/66* (2021.01); *B22F 12/30* (2021.01);
(Continued)

(58) Field of Classification Search
CPC .......... B22F 10/28; B22F 10/66; B22F 12/41; B22F 12/30; B22F 10/36; B22F 2201/11;
(Continued)

(56) References Cited

U.S. PATENT DOCUMENTS

| | | |
|---|---|---|
| 2004/0191106 A1 | 9/2004 | O'Neill et al. |
| 2009/0286008 A1 | 11/2009 | O'Neill et al. |

(Continued)

FOREIGN PATENT DOCUMENTS

| | | |
|---|---|---|
| CH | 710 543 A2 | 6/2016 |
| CN | 108411296 A | 8/2018 |

(Continued)

OTHER PUBLICATIONS

International Search Report mailed on Jul. 2, 2020 in PCT/EP2020/065925 filed on Jun. 9, 2020 (3 pages).

(Continued)

*Primary Examiner* — Thien S Tran
*Assistant Examiner* — Simpson A Chen
(74) *Attorney, Agent, or Firm* — Oblon, McClelland, Maier & Neustadt, L.L.P.

(57) ABSTRACT

A method for laser additive manufacturing of a mechanical part includes providing a laser beam the operation of which will be controlled by a computer into which is introduced a CAD computer file which is cut into one or more strata which, once superimposed, allow to form the structure of the desired mechanical part, disposing a substrate in a manufacturing enclosure wherein an atmosphere of a neutral gas is created, depositing on the substrate at least a first layer of (Continued)

a powder of a first metallic material to be melted, levelling the first layer, subjecting by means of the laser beam the first layer to a selective melting step, if necessary, depositing on the substrate a second layer, levelling the second layer and subjecting this second layer to a step of selective melting, removing the excess material and cleaning the assembly and subjecting the part to finishing operations.

19 Claims, 7 Drawing Sheets

(51) Int. Cl.

| | |
|---|---|
| *B22F 10/66* | (2021.01) |
| *B22F 12/30* | (2021.01) |
| *B22F 12/41* | (2021.01) |
| *B23K 26/12* | (2014.01) |
| *B23K 26/342* | (2014.01) |
| *B33Y 10/00* | (2015.01) |
| *B33Y 30/00* | (2015.01) |
| *B33Y 40/10* | (2020.01) |
| *B33Y 40/20* | (2020.01) |
| *B33Y 80/00* | (2015.01) |

(52) U.S. Cl.
CPC ............ *B22F 12/41* (2021.01); *B23K 26/123* (2013.01); *B23K 26/127* (2013.01); *B23K 26/342* (2015.10); *B33Y 10/00* (2014.12); *B33Y 30/00* (2014.12); *B33Y 40/10* (2020.01); *B33Y 40/20* (2020.01); *B33Y 80/00* (2014.12); *B22F 2201/11* (2013.01); *B22F 2301/052* (2013.01); *B22F 2301/255* (2013.01)

(58) Field of Classification Search
CPC ......... B22F 2301/052; B22F 2301/255; B33Y 10/00; B33Y 30/00; B33Y 80/00; B33Y 40/20; B33Y 40/10; B23K 26/342; B23K 26/123; B23K 26/127
USPC .......................................................... 219/74
See application file for complete search history.

(56) References Cited

U.S. PATENT DOCUMENTS

| | | | |
|---|---|---|---|
| 2010/0291286 A1 | 11/2010 | O'Neill et al. | |
| 2013/0056912 A1 | 3/2013 | O'Neill et al. | |
| 2014/0061165 A1 | 3/2014 | Stempfer | |
| 2015/0198052 A1 | 7/2015 | Pavlov et al. | |
| 2015/0209889 A1 | 7/2015 | Peters et al. | |
| 2015/0258735 A1 | 9/2015 | O'Neill et al. | |
| 2015/0273631 A1* | 10/2015 | Kenney | B33Y 70/00 219/76.1 |
| 2016/0052162 A1 | 2/2016 | Colin et al. | |
| 2016/0176126 A1* | 6/2016 | Kissling | B29B 11/14 428/156 |
| 2017/0123237 A1* | 5/2017 | DeMuth | B22F 10/36 |
| 2017/0252854 A1 | 9/2017 | Maier et al. | |
| 2018/0050423 A1* | 2/2018 | Hoferer | B33Y 50/02 |
| 2018/0117845 A1* | 5/2018 | Buller | B29C 64/159 |
| 2019/0105735 A1* | 4/2019 | Brunhuber | B23K 26/361 |
| 2019/0270254 A1* | 9/2019 | Mark | B29C 64/118 |
| 2020/0086625 A1 | 3/2020 | O'Neill et al. | |
| 2021/0170487 A1* | 6/2021 | Liu | B22F 3/24 |
| 2021/0283687 A1* | 9/2021 | Nauka | B33Y 30/00 |

FOREIGN PATENT DOCUMENTS

| | | |
|---|---|---|
| JP | 2014-512961 A1 | 5/2014 |
| JP | 2016-128799 A1 | 7/2016 |
| JP | 2018-145526 A1 | 9/2018 |

OTHER PUBLICATIONS

Syed-Khaja et al., "Is Selective Laser Melting (SLM) an Alternative for High-temperature Mechatronic Integrated Devices? Methodology, Hurdles and Prospects", 2016 12th International Congress Molded Interconnect Devices (MID), IEEE, Sep. 28, 2016, pp. 1-5.
Japanese Office Action issued Jan. 4, 2023, in Japanese Patent Application No. 2021-5749969 (with English translation), 6 pages.
Combined Chinese Office Action and Search Report issued Feb. 18, 2023 in Chinese Patent Application No. 202080045980.0 (with English Translation of Office Action only), 22 pages.
International Preliminary Report on Patentability Issued Mar. 30, 2021 in PCT/EP2020/065925 (submitting English translation only), 8 pages.

* cited by examiner

METHOD FOR LASER BEAM ADDITIVE MANUFACTURING OF A MECHANICAL PART WITH TECHNICAL AND/OR DECORATIVE FUNCTION AND MECHANICAL PART WITH TECHNICAL AND/OR DECORATIVE FUNCTION

TECHNICAL FIELD OF THE INVENTION

The present invention relates to a method for laser beam additive manufacturing of mechanical parts. The present invention also relates to such mechanical parts, in particular obtained by implementing the additive manufacturing method.

TECHNOLOGICAL BACKGROUND OF THE INVENTION

The technique of additive manufacturing by laser melting of metal parts has been known for more than two decades and is used in particular in the field of aeronautical and automotive construction.

Briefly described, the selective melting method by means of a laser beam, also known as Selective Laser Melting or SLM, is a rapid prototyping technique by melting a powder of a metallic material by means of a laser beam such as a carbon dioxide $CO_2$ laser or a YAG laser, the maximum power of which is typically comprised between 100 Watts and 2 to 3 kilowatts. This selective melting method is used to create, stratum after stratum, three-dimensional objects from powders of metallic materials which are brought to their melting temperature thanks to the energy supplied by the laser beam.

The conventional laser additive manufacturing method begins with the development of a CAD (Computer Aided Design) type computer file which will define the volume of the part that is sought to be designed. This computer file comprises one or more two-dimensional strata which, when superimposed, allow to reconstruct the part that is sought to be designed.

After having spread a layer of uniform thickness of a metallic material in the powder state on a platform of a laser beam additive manufacturing machine, the laser beam draws a first 2D stratum on the surface of the metallic powder layer. Under the effect of the light energy supplied by the laser beam, the metal powder melts and then solidifies according to the outline of the first 2-dimensional stratum used to control the movement of the laser beam. A new layer of metal powder is spread over the entire surface of the platform, then the process of bringing the metal powder particles to their melting temperature by means of the laser beam is repeated until the part is finished.

The part is manufactured by additive printing directly on the surface of the platform as described above. In some cases, this manufacturing begins with the production, layer after layer, of a support on the platform, and continues with the production of the part itself. In this case, the support serves to mechanically support the part as it is manufactured on the platform of the printing machine and allows the heat produced by the melting of the metal powder by means of the laser beam to be removed.

The part thus obtained must then be carefully withdrawn from the platform of the additive manufacturing machine and cleaned of the non-melted powder which surrounds it. If the part was manufactured with a support, the part is separated from the latter.

One of the disadvantages of conventional laser additive manufacturing methods lies in the fact that after completion of the desired part, this part must be detached from the platform of the additive manufacturing machine then, if necessary, detached from its support. This is a delicate operation that takes a long time and during which, despite the precautions taken, many parts deform plastically and must be scrapped.

Another laser beam additive manufacturing technique involves having a substrate that is installed in the machine before the start of manufacturing operations. This substrate on which the part will be manufactured is flush with the surface of the platform of the additive manufacturing machine.

The substrate, which is metallic, allows to efficiently remove the heat caused by melting the powder and therefore to relax at least in part the thermal stresses which are present in the part being manufactured. Additional heat treatment after printing the part will completely eliminate thermal stress. The metal powder by means of which the part is manufactured is most often of the same nature as the material from which the substrate is made because this promotes the attachment of the part to the substrate. Sometimes the composition of the alloy from which the powder is made varies slightly relative to the alloy composition of the substrate. It has also already been proposed to use, to manufacture the part, a powder made of a metal different from that from which the substrate is made, for cost reasons, for example when a precious metal is used to produce the part, or when using a different metal to be machined such as titanium.

Consequently, until now, for the additive manufacturing of parts by means of a laser beam, the choice of material for the substrate and for the part manufactured by additive printing on the substrate was most often limited to the same metal for the substrate and the part. In some cases, it has been proposed to make the part from a metal alloy slightly different from that from which the substrate is made or else from a material which has been shown to be compatible with the material of the substrate.

SUMMARY OF THE INVENTION

The purpose of the present invention is to provide a laser additive manufacturing method allowing to vary the choices of materials which can be used to produce mechanical parts in a reliable and reproducible manner.

To this end, the object of the present invention is a method for laser additive manufacturing of a mechanical part with technical and/or decorative function, this mechanical part comprising a substrate and a structure formed on the substrate by laser additive manufacturing, this method comprising the steps of:

providing a laser beam the operation of which will be controlled by means of a computer into which is introduced a 2-dimensional CAD computer file which corresponds to the structure of the desired mechanical part, or else a 3-dimensional CAD computer file which is cut into 2-dimensional strata which, once superimposed, allow to form the structure of the desired mechanical part, another computer file containing the operating parameters of the laser beam;

providing a substrate made of a ceramic material whose melting temperature is higher than the temperature involved by laser additive manufacturing;

disposing the substrate on a platform of a manufacturing enclosure;

closing the manufacturing enclosure and creating in this manufacturing enclosure an atmosphere of a neutral gas;

depositing on the substrate at least a first layer of a powder of at least a first metallic material to be melted;

levelling the first layer of the first metallic material to be melted so that this first layer has a substantially uniform thickness;

activating the laser beam and subjecting by means of this laser beam the first layer of the first metallic material to a selective melting step in accordance with the CAD computer file which corresponds to the 2-dimensional stratum of the structure of the desired mechanical part;

depositing on the substrate at least a second layer of a metallic powder of the same material as that by means of which the first layer was produced or of a second metallic material which is different from the first metallic material;

levelling the second layer and subjecting this second layer to a step of selective melting by means of the laser beam in accordance with the next two-dimensional stratum of the CAD computer file;

if necessary, repeating the operations until obtaining the desired mechanical part consisting of the substrate and the structure formed on the substrate by laser additive manufacturing;

removing the mechanical part from the manufacturing enclosure, removing the excess metallic material and cleaning the assembly, and if necessary, subjecting the part to finishing operations such as polishing.

Thanks to these features, the present invention provides a laser additive manufacturing method allowing the joint use of a solid ceramic substrate and a metal powder to produce mechanical parts with technical and/or decorative function of very high quality. It has indeed been observed that the metal structure obtained by laser melting adheres sufficiently to the ceramic substrate on which this structure is made and allows to obtain mechanical parts that can be directly used in the objects wherein they are intended to be mounted. This result is quite surprising given that a priori, the chemical (ionic/covalent) affinity between the metal atoms bonded together by ionic bonds and the oxygen contained in ceramics whose atoms are bonded by covalent bonds is low. However, it has been observed in particular that the atoms of titanium combine well with the oxygen contained in the ceramic substrate to form molecules of titanium dioxide $TiO_2$. Likewise, aluminium atoms have a good affinity for the oxygen atoms of a substrate made of alumina, sapphire or zirconia for example.

The substrate belongs to the mechanical part with technical and/or decorative function that results from the method of the invention; this substrate is integral with this mechanical part, and is not intended to be separated from the structure obtained by laser additive manufacturing at the end of the method. Indeed, it has been observed that this structure adheres sufficiently well to the surface of the substrate on which it was produced so that the resulting mechanical part can be integrated as it is into the object for which it is intended. Thus, thanks to the invention, the perilous step of separating the part obtained by laser additive manufacturing from the platform of the additive manufacturing machine is avoided, so that the risks of plastic deformation which can lead to the destruction of the part, are avoided. Likewise, avoiding this separation step saves time, in particular because it is not necessary to have to fix, for example by gluing, the parts obtained by additive manufacturing on separate substrates.

According to special embodiments of the invention:

before the step of selectively melting the layer of powder material, the substrate can be subjected to a surface treatment;

the surface treatment consists in an ion implantation operation, a plasma torch treatment or a physical vapour deposition treatment;

the substrate is preheated prior to the step of selectively melting the layer of powder material;

the substrate is preheated to a temperature not exceeding 400° C., the thickness of the substrate is at least 100 µm;

the neutral gas is argon and the volume concentration of oxygen in the manufacturing enclosure is less than 0.5%;

the ceramic material is selected from the group formed by borosilicate glass, alumina, sapphire, titanium boride, titanium oxide $TiO_2$, titanium carbide, tungsten carbide, silicon nitride, zirconia, emerald, ruby and diamond;

the metallic material is selected from the group formed of aluminium, steel, titanium, zirconium, palladium, platinum, silver and gold;

the thickness of a layer of material deposited on the substrate is comprised between 20 µm and 45 µm;

the laser beam is of the Nd:YAG type;

the maximum power of the laser beam is comprised between 100 Watts and 300 Watts;

the 2-dimensional stratum of the desired mechanical part has a contour which delimits at least one surface;

the size of the particles which form the powders is comprised between 5 µm and 63 µm, and the powders of materials used are of the D10-D90 type, that is to say that 90% of the particles which form these powders have a diameter of less than 63 µm, and 10% of these particles have a diameter of less than 5 µm.

The present invention also relates to a mechanical part with technical and/or decorative function, this mechanical part comprising a ceramic substrate and a metal structure formed on the substrate by laser additive manufacturing.

It should be noted in particular that subjecting the ceramic substrate to a surface treatment by ion implantation, plasma torch or physical vapour deposition prior to the step of selectively melting the layer of powdered metallic material allows to further improve the force of attachment of the structure formed on the substrate with the latter.

BRIEF DESCRIPTION OF THE FIGURES

Other features and advantages of the present invention will emerge more clearly from the detailed description which follows of an example of implementation of the additive manufacturing method according to the invention, this example being given purely by way of illustration and not limiting only in connection with the appended drawing on which.

DETAILED DESCRIPTION OF AN EMBODIMENT OF THE INVENTION

The present invention proceeds from the general inventive idea of producing mechanical parts with technical and/or decorative function in a single piece by means of an additive manufacturing method by laser beam. More specifically, the invention relates to an additive manufacturing method by laser beam wherein the joint use of a solid ceramic substrate and of a metal powder to produce the structure by laser additive manufacturing allows to obtain high quality mechanical parts with technical and/or decorative function. It has indeed been observed that the metal structure obtained by laser melting adheres sufficiently to the ceramic substrate on which this structure is made and allows to obtain mechanical parts that can be directly used in the objects wherein they are intended to be mounted. This seems to be due in particular to the good chemical (ionic/covalent) affinity between the metal atoms and the oxygen contained in the ceramics. For example, the titanium atoms combine well with the oxygen contained in the ceramic substrate to form titanium dioxide molecules $TiO_2$. Likewise, aluminium atoms have a great affinity for the oxygen atoms of a substrate such as alumina, sapphire or zirconia. The invention thus demonstrates that it is possible to combine or bond together materials which, until now, were considered incompatible.

On the other hand, it was observed that the same affinity for the oxygen contained in the ceramic material in the case of gold was not obtained. This is why, when it is desired to grow a gold structure by laser melting on a ceramic substrate, it is preferable to subject the ceramic substrate to a surface treatment for example of the ion implantation, plasma torch or else physical vapour deposition type. In the case of plasma treatment, the gas used to create the torch will preferably be compressed air containing 22% oxygen and about 70% nitrogen.

The ceramic substrate used to make the desired mechanical part is integral with this mechanical part and therefore does not need to be separated from the latter once the manufacturing method is complete. This ceramic substrate is therefore not intended to be sacrificed and will serve as a permanent support for the structure obtained through laser additive manufacturing with which it forms the mechanical part according to the invention. The risks of deforming or even destroying this structure that were encountered in the prior art during the separation of such a structure from its manufacturing substrate are thus avoided.

In accordance with the method according to the invention, first provision is made of a substrate on which a structure will be grown by additive manufacturing using a laser beam. The shapes and dimensions of the substrate are selected according to the subsequent use that will be made of the mechanical part resulting from the implementation of this method. It is sufficient that the substrate has at least one flat surface on which the additive manufacturing operation can be carried out. For reasons of strength, however, it is preferred that the thickness of the substrate is not less than 100 μm. This substrate is made of a ceramic material whose melting temperature is higher than the temperature involved by laser melting additive manufacturing. The substrate is made of a ceramic material such as alumina $Al_2O_3$, sapphire, titanium oxide $TiO_2$ or zirconia $ZrO_2$. Other ceramic materials that are equally suitable are silicon nitride $Si_3N_4$ and titanium carbide TiC.

Once the substrate has been selected and introduced into a manufacturing enclosure, a layer of powdered material is deposited on this substrate, which is then selectively melted by means of the laser beam. This pulverulent material is different from the material from which the substrate is made. This powder material is a metallic material such as aluminium, gold, platinum, titanium, steel or else zirconium.

In the case of aluminium, the choice will preferably be made on a 6061 aluminium alloy comprising between 95.85 and 98.56% by weight of aluminium, 0.4 to 0.8% by weight of silicon, a maximum of 0.7% by weight of iron (no minimum required), 0.15 to 0.4% by weight of copper, a maximum of 0.15% by weight of manganese (no minimum required), between 0.8 and 1.2% of magnesium, between 0.04 and 0.35% of chromium, a maximum of 0.25% by weight of zinc (no minimum required), a maximum of 0.15% by weight of titanium (no minimum required), the concentration of the other elements not having to exceed 0.05% by weight each, the total concentration of these other elements not having to exceed 0.15% by weight. The 6061 aluminium powder used in the context of the present invention is formed from a mixture of particles whose diameter is comprised between 5 and 63 μm.

Parts made by depositing 10 to 20 layers of the aluminium powder detailed above have been structured on a zirconia substrate. Likewise, a zirconia substrate was used to manufacture parts from titanium powder $TiAl_6V_4$.

In the case of gold, it is preferably 18 karat gold containing 750 thousandths of pure gold, 50 thousandths of silver and 198.5 thousandths of copper. The gold powder used in the context of the present invention is formed from a mixture of particles whose diameter is comprised between 5 and 45 μm.

Parts made by depositing 10 to 20 layers of the gold powder detailed above have been structured on sapphire and zirconia substrates.

Once the layer of powdered material is spread over the substrate, it is levelled by mechanical sweeping in order to have a substantially uniform thickness, typically in the range of 15-50 μm. It will be understood that during this sweeping operation, the powder particles the diameter or at least one of the dimensions of which exceeds the thickness of the layer are removed from the substrate.

Once the layer of powder material is equalised, the manufacturing enclosure is closed and an atmosphere of neutral gas is created in the volume of this enclosure. The neutral gas selected is preferably, but in a non-limiting manner, argon, and the volume concentration of oxygen in the manufacturing enclosure is less than 0.5%.

The laser device used in the context of the present invention is for example a Yb:YAG type laser, the maximum power of which is equal to 100 Watts and which emits continuously. As a preferred but non-limiting example, depending on the selected type of laser beam, the power thereof is set at a working value comprised between 10 and 35 Watts and its speed of movement on the surface of the substrate is comprised between 100 and 700 mm/s. The laser beam melts the layer of powder material spread over the substrate in an outline determined by a computer wherein a CAD computer file is stored. This file corresponds to one or more 2-dimensional strata which, once superimposed, allow to form in the layer of powder material the structure of the desired mechanical part. Another computer file containing, for each stratum of the desired mechanical part, the operating parameters of the laser beam such as the power of the laser beam, the speed of movement of the laser beam and the path that this laser beam must travel is also used.

Each stratum of molten material therefore has a thickness comprised between 15 µm and 50 µm. The thickness of the final structure can be in the range of 500 µm to 1 mm. The only difference between these values is the manufacturing time, which is as long as the final structure is thick.

After structuring the first layer of powder material by selectively melting this material according to the instructions contained in the CAD computer file, the excess material is removed, then a second layer of powdered material which can be the same as that used to make the first layer or which can be different, is deposited on the substrate. Finally, the operations are repeated until obtaining the desired mechanical part consisting of the substrate and the structure formed on the substrate by laser additive manufacturing. The resulting mechanical part is taken out of the manufacturing enclosure, excess material is removed and the assembly is cleaned. The resulting mechanical part is ready for use.

Figure 1:
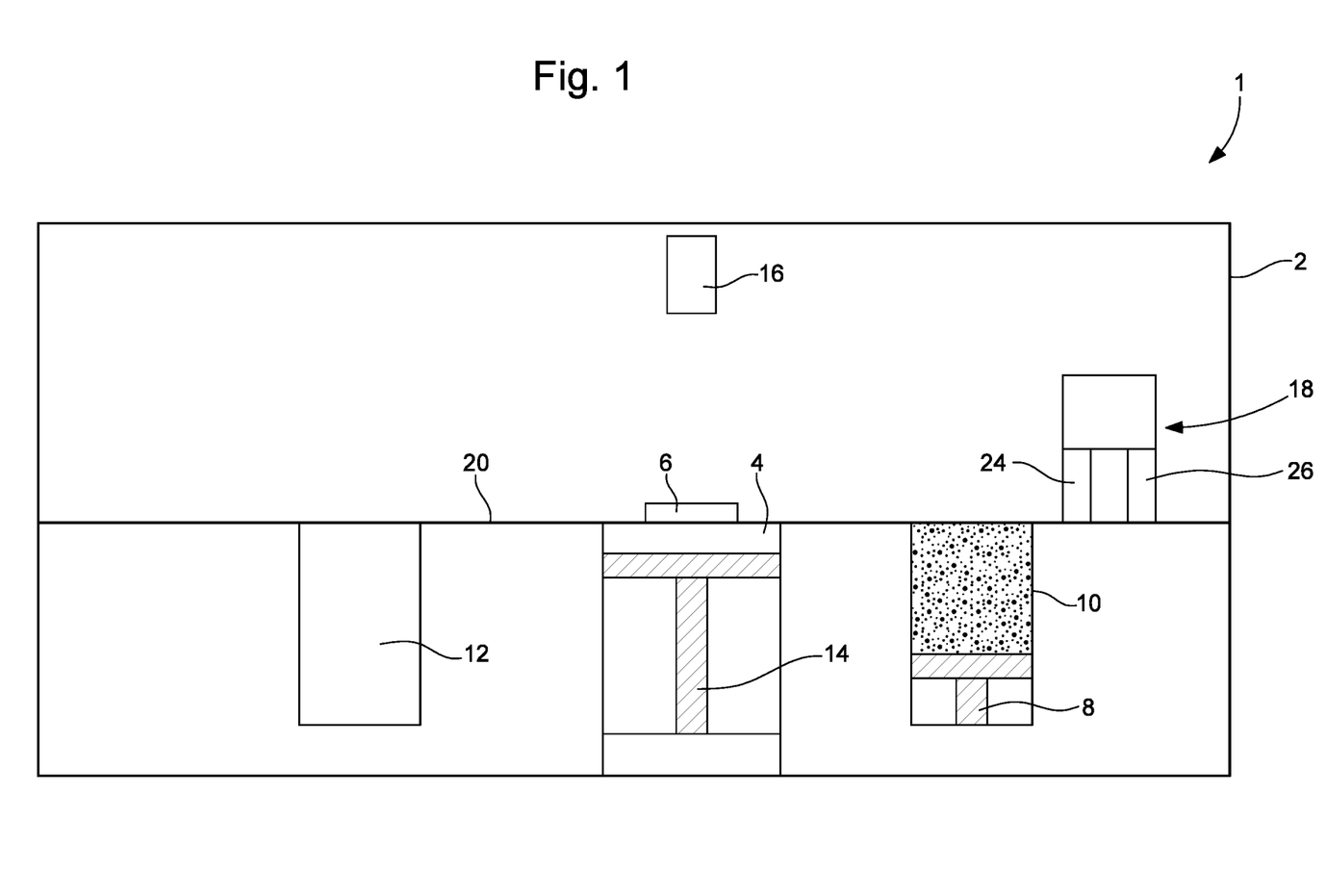
FIG. 1 is a schematic representation of a laser beam additive manufacturing installation suitable for implementing the method according to the invention.

FIG. 1 is a schematic representation of a laser beam additive manufacturing installation suitable for implementing the method according to the invention. Designated as a whole by the general reference numeral 1, this additive manufacturing installation comprises a manufacturing enclosure 2 inside which is arranged a platform 4 on which is placed a substrate 6. Preferably, the platform 4 is coupled with a first piston 8 so that it can be moved vertically from bottom to top and from top to bottom. The additive manufacturing installation 1 also comprises a first reservoir 10 and a second reservoir 12 both arranged inside the manufacturing enclosure 2. The first reservoir 10 inside which a second piston 14 moves is used for storage of a powder material to be melted. As for the second reservoir 12, it serves as a receptacle for excess powder of the material to be melted as well as for waste from the selective melting step. The manufacturing enclosure 2 also contains a laser beam 16 disposed directly above the platform 4 on which the substrate 6 is placed, as well as a head 18 for transferring the powder of the material to be melted.

Figure 2:
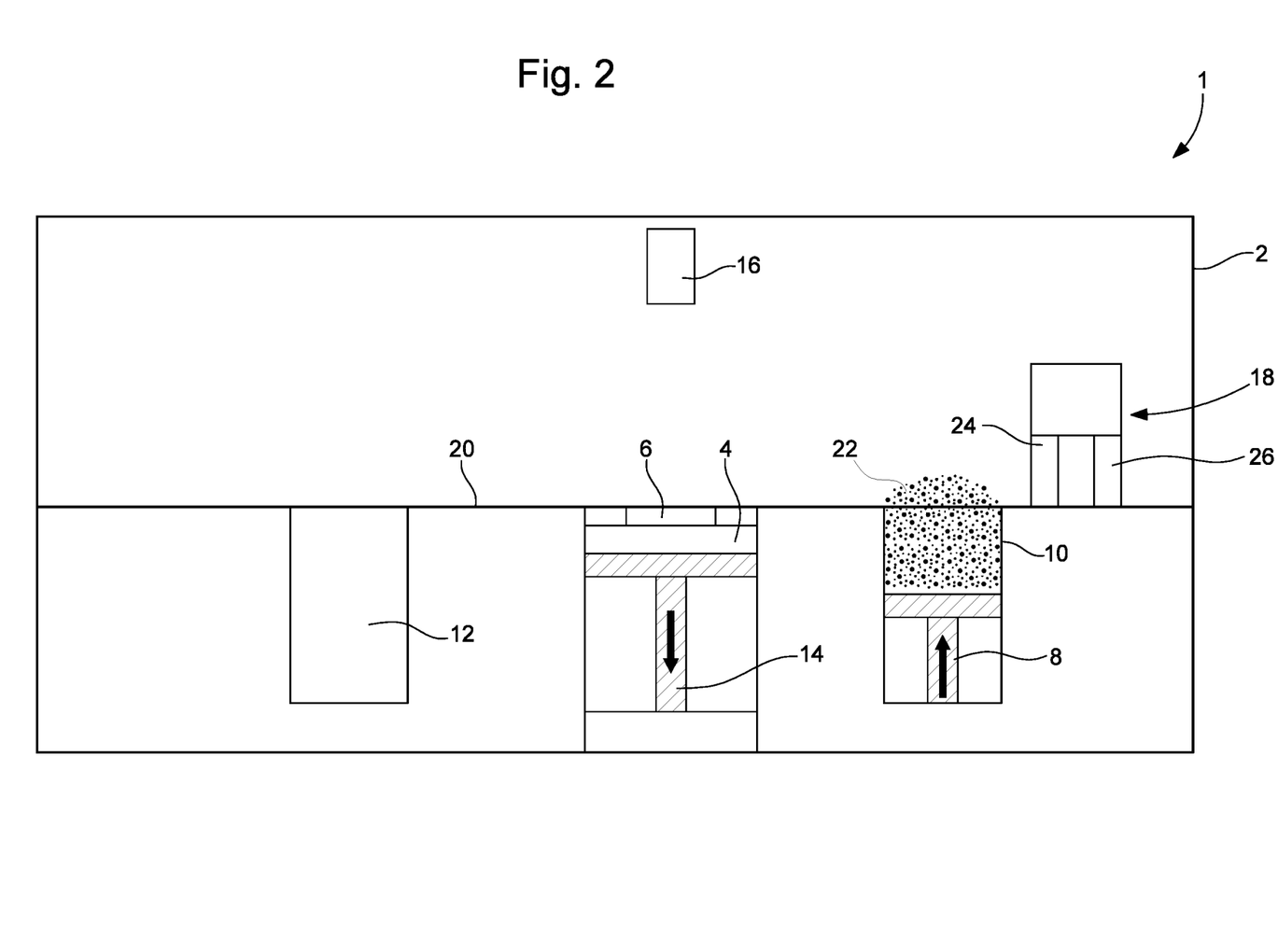
FIG. 2 is a detailed schematic view which illustrates the situation of the additive manufacturing installation before the start of the additive manufacturing method.

In FIG. 2, the substrate 6 is placed flush with a printing surface 20 by actuating, if necessary, the first piston 8 which controls the movements of the platform 4 on which the substrate 6 is placed. At the same time, the second piston 14 is actuated so as to bring an amount of powder 22 of the material to be melted to the height of the printing surface 20.

Figure 3:
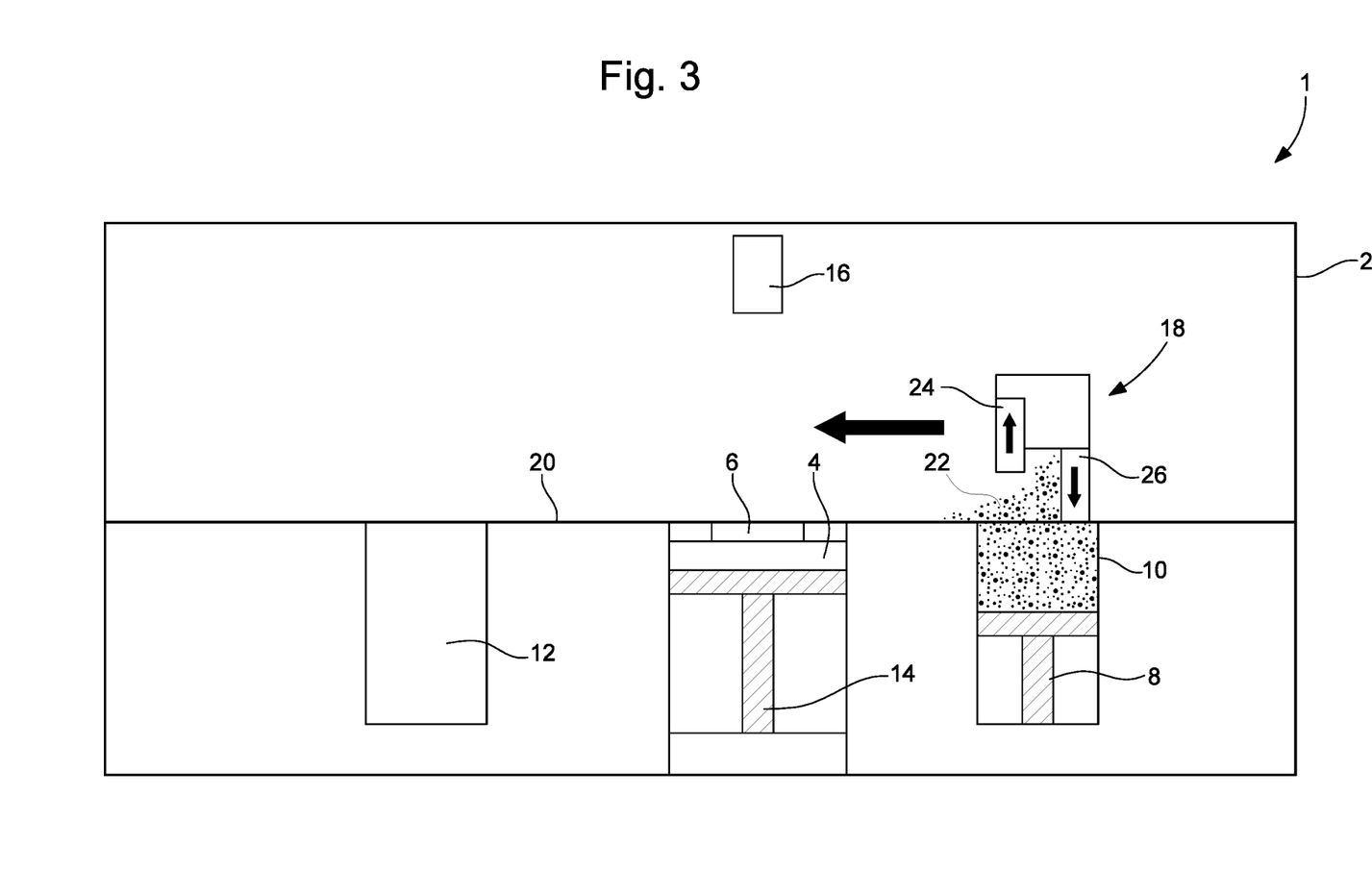
FIG. 3 is a detailed schematic view which illustrates the deposition of the first layer of powder material to be melted onto the substrate.

In FIG. 3, the transfer head 18 is responsible for bringing the amount of powder 22 of the material to be melted onto the substrate 6. To this end, the transfer head 18 is equipped with a first and a second scraper 24 and 26 which can be selectively raised or lowered. As visible in FIG. 3, to bring the amount of powder 22 on the substrate 6, the transfer head 18 is translated to the left of the figure, the first scraper 24 being raised so as not to oppose the advancement of the amount of powder 22, and the second scraper 26 being lowered in order to be able to move this amount of powder 22.

Figure 4:
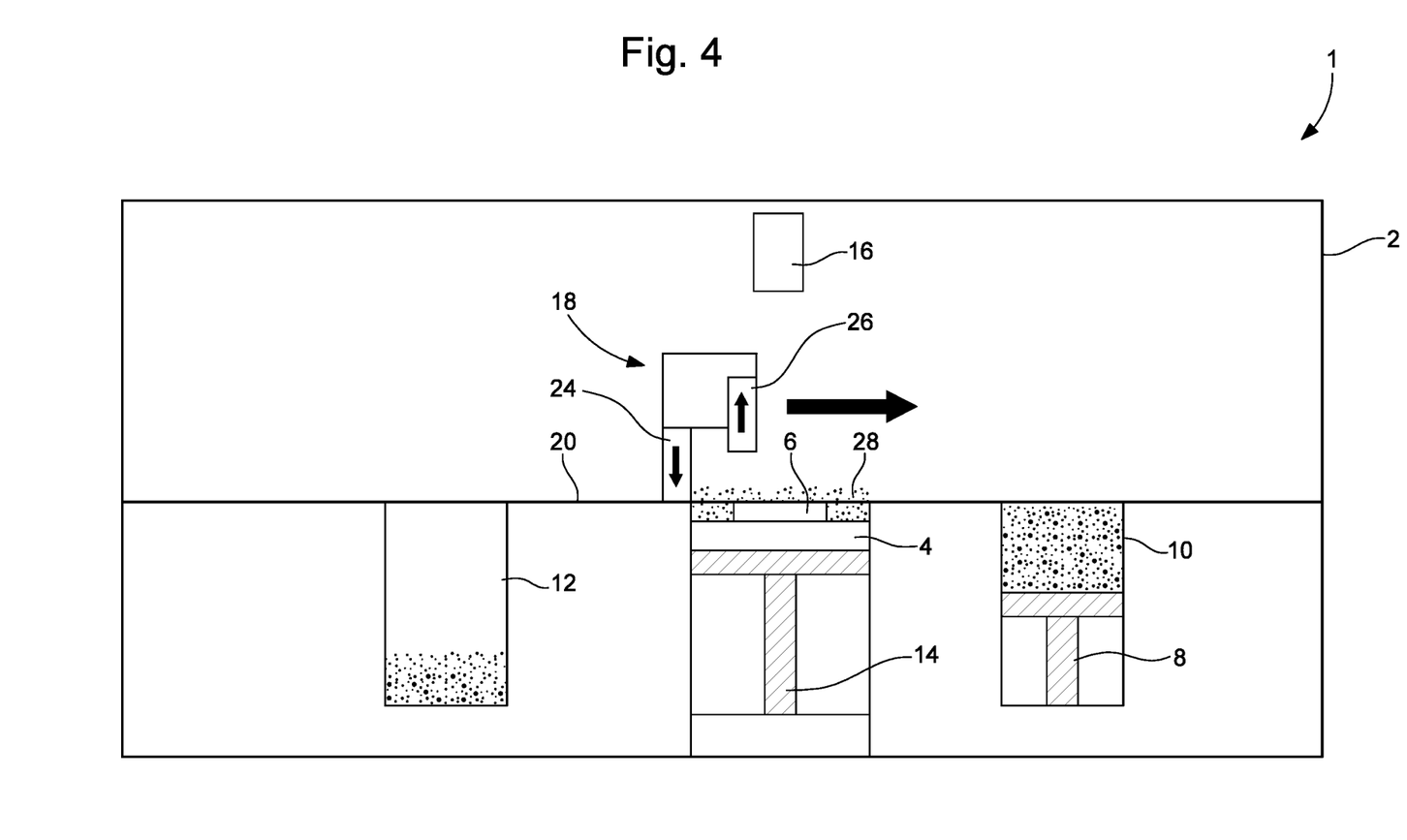
FIG. 4 is a schematic detail view which illustrates the removal of excess powder material.

Conversely, in FIG. 4, the transfer head 18 is moved to the right of the figure with the first scraper 24 lowered and the second scraper 26 raised to level and compact the layer of powder material 28 which has been brought onto the substrate. 6.

Figure 5:
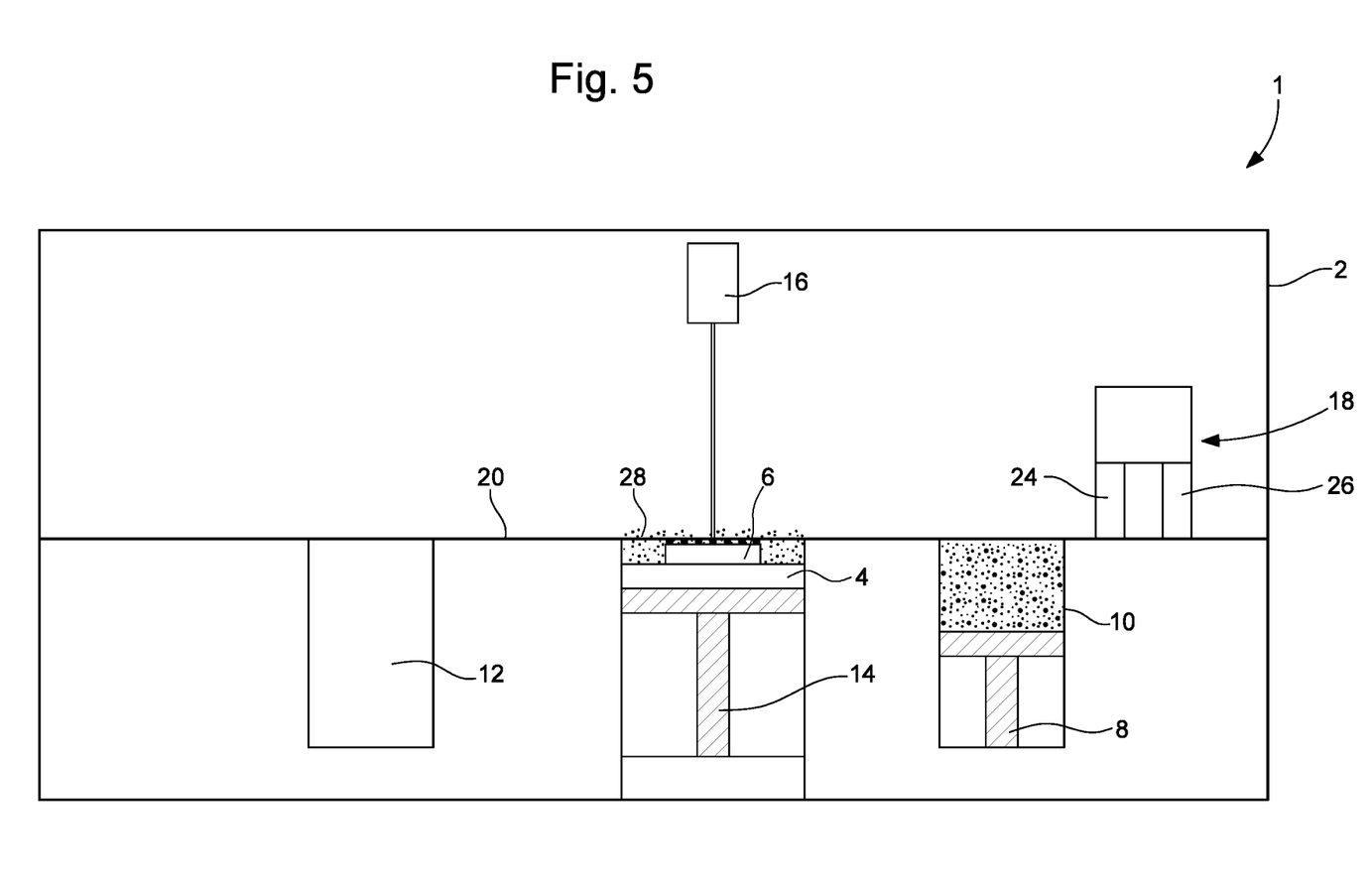
FIG. 5 is a detailed schematic view which illustrates the step of selectively melting, by means of a laser beam, the first layer of powder material.

In FIG. 5, the layer of powdered material 28 is melted using the laser beam 16. To this end, the operation of the laser beam 16 will be controlled by means of a computer into which is introduced a CAD computer file which is cut into one or more strata which, once superimposed, allow to form the structure 30 of the desired mechanical part 32.

Figure 6:
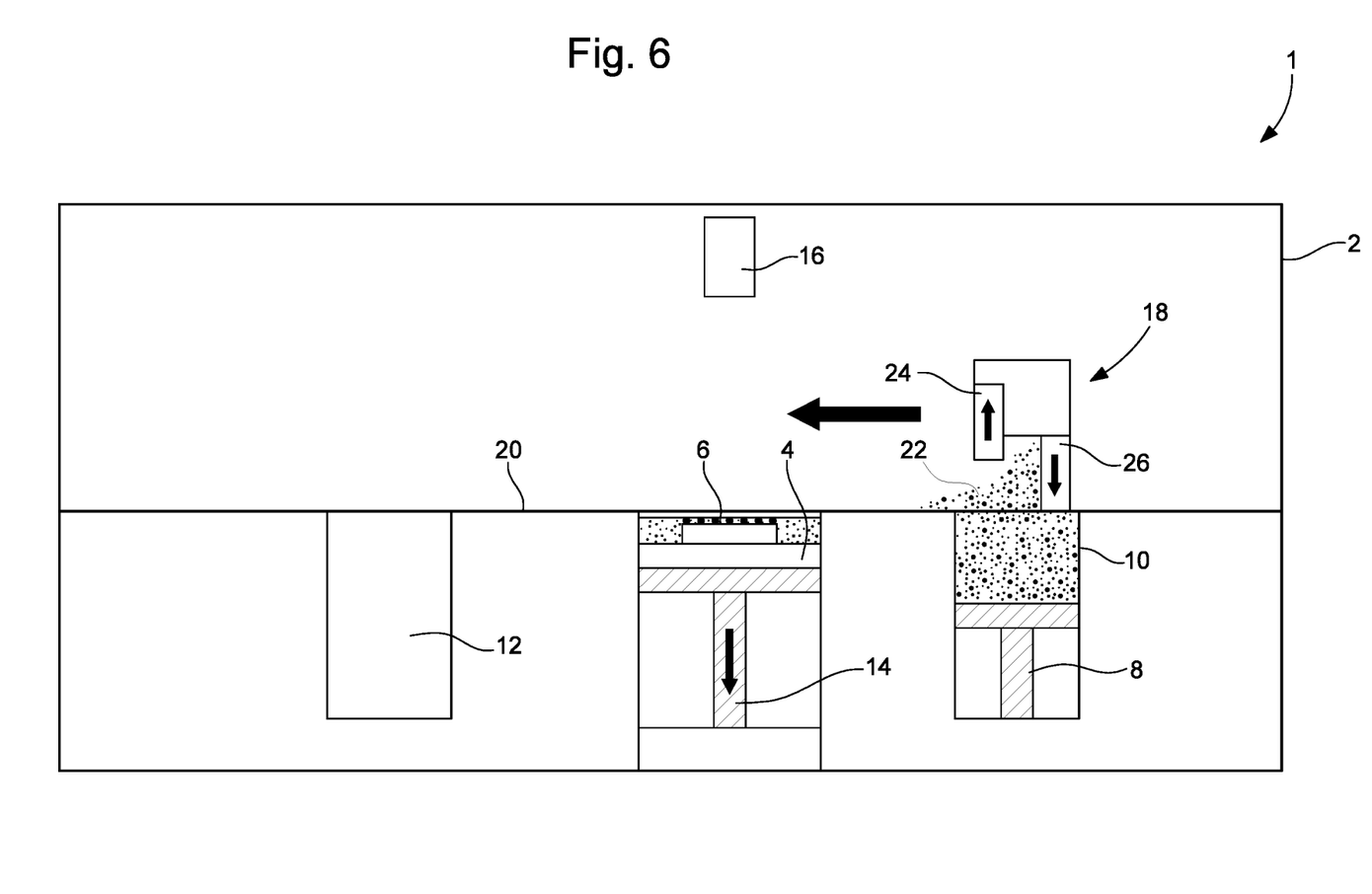
FIG. 6 is a detailed schematic view which illustrates the step of selectively melting an additional layer of powder material.

In FIG. 6, the platform 4 on which the substrate 6 is placed is lowered by actuating the first piston 8 in order to place the substrate 6 on the surface of which the first layer of powder material 28 has been structured flush again with the printing surface 20. Then, if it is desired to structure a new layer of powder material on the surface of the substrate 6, the operations which have been detailed above in connection with FIGS. 2 to 5 are repeated.

Figure 7:
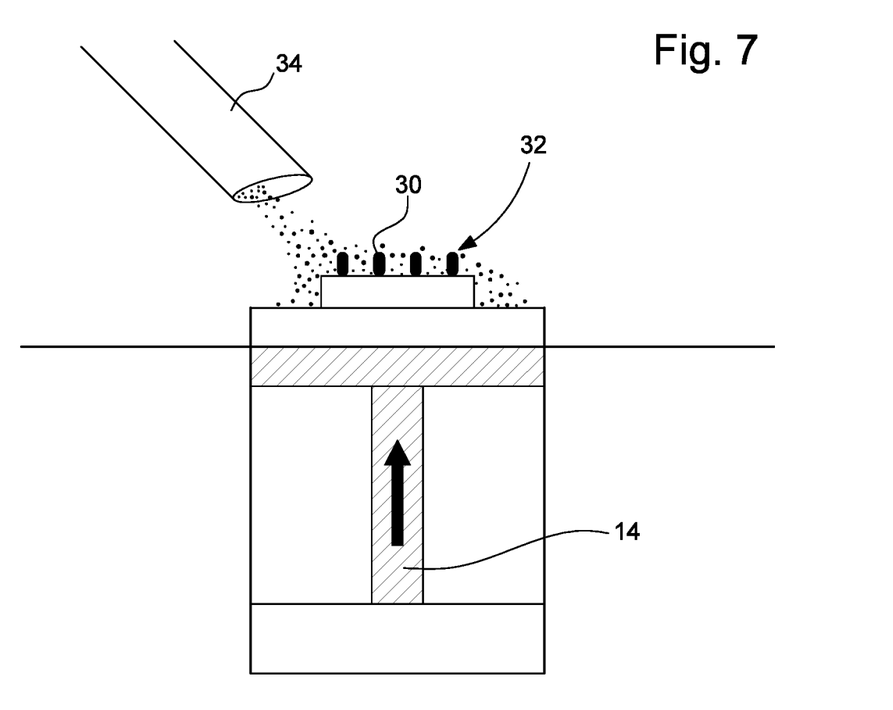
FIG. 7 is a detailed schematic view which illustrates the final step of cleaning the substrate, and FIG. 8 schematically illustrates a substrate preparation step by means of a plasma torch prior to the deposition of a first layer of powder material to be melted on the substrate.

Finally, when the desired structure 30 is obtained by having subjected the first layer of powdered material 28 to a step of selective melting by means of the laser beam 16, it is possible, if necessary, to clean the mechanical part 32 formed by the substrate 6 and the structure 30, for example by means of a vacuum cleaner 34 (see FIG. 7).

Figure 8:
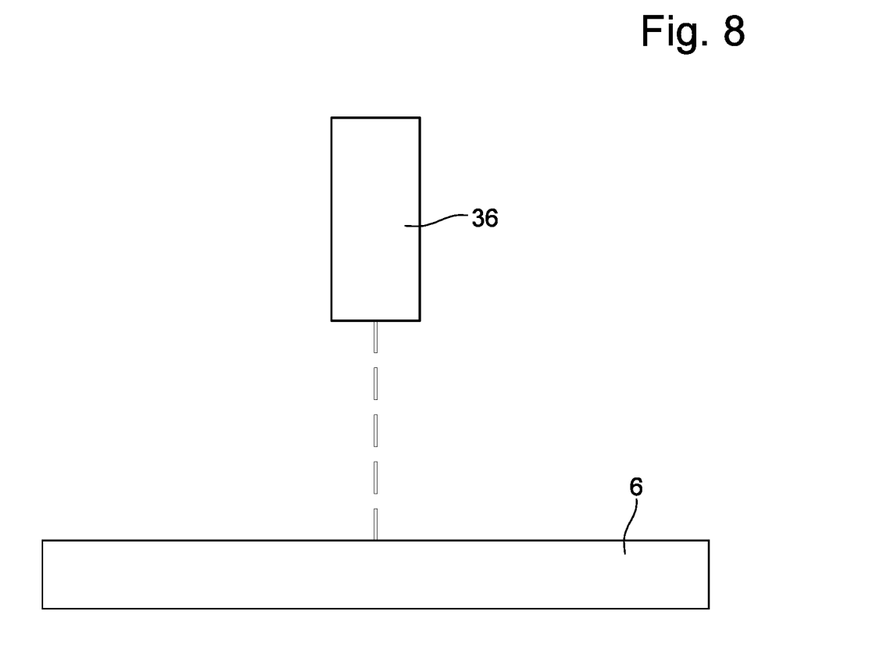

To improve the adhesion of the structure 30 obtained by additive manufacturing by means of the laser beam 16 on the substrate 6, it is possible, before the start of the manufacturing operations, to subject the substrate 6 to a surface treatment by means of a plasma torch 36 (see FIG. 8).

It goes without saying that the present invention is not limited to the embodiment which has just been described and that various modifications and simple variants can be considered by the person skilled in the art without departing from the scope of the invention as defined by the appended claims. It will be understood in particular that within the meaning of the present invention and of its particular embodiments, the term "mechanical part" is understood to mean parts which can be mechanically stressed such as links of a watch bracelet, but also parts which have only a decorative function such as a dial for a timepiece on the surface of which a material structure has been manufactured.

NOMENCLATURE

1. Laser beam additive manufacturing installation
2. Manufacturing enclosure
4. Platform
6. Substrate
8. First piston
10. First reservoir
12. Second reservoir
14. Second piston
16. Laser beam
18. Transfer head
20. Printing surface
22. Amount of powder
24. First scraper
26. Second scraper
28. Layer of powder material
30. Structure
32. Mechanical part
34. Vacuum cleaner
36. Plasma torch

The invention claimed is:

1. A method for laser additive manufacturing of a mechanical part with technical and/or decorative function, this mechanical part comprising a substrate and a structure formed on the substrate by laser additive manufacturing, this method comprising the steps of:
   providing a laser beam the operation of which will be controlled by means of a computer into which is introduced a CAD computer file which is cut into one or more strata which, once superimposed, allow to form the structure of the desired mechanical part, another computer file containing the operating parameters of the laser beam;
   providing the substrate made of a ceramic material whose melting temperature is higher than the temperature involved by laser additive manufacturing; disposing the substrate on a platform in a manufacturing enclosure; closing the manufacturing enclosure and creating in this manufacturing enclosure an atmosphere of a neutral gas;
   depositing on the substrate at least a first layer of a powder of at least a first metallic material to be melted;
   levelling, with a leveller, the first layer of the first metallic material to be melted so that this first layer has a uniform thickness, the leveller including a first scrapper and a second scraper, wherein during levelling in a first direction, the first scraper is raised to avoid the first metallic material and the second scraper is lowered to move the first metallic material and form the first layer, and during levelling in a second direction opposite to the first direction, the first scraper is lowered to move the first metallic material and the second scraper is raised to avoid the first metallic material;
   activating the laser beam and subjecting by means of this laser beam the first layer of the first metallic material to a first selective melting step in accordance with the CAD computer file which corresponds to the 2-dimensional stratum of the structure of the desired mechanical part;
   depositing on the substrate at least a second layer of a powder of the same metallic material as that with which the first layer was produced or of a second metallic material which is different from the first metallic material;
   levelling the second layer and subjecting this second layer to a second step of selective melting by means of the laser beam in accordance with the following two-dimensional stratum of the CAD computer file;
   if necessary, repeating the operations until obtaining the desired mechanical part consisting of the substrate and the structure formed on the substrate by laser additive manufacturing;
   removing the mechanical part from the manufacturing enclosure, removing the excess metallic material and cleaning the assembly, and
   if necessary, subjecting the mechanical part to finishing operations such as polishing.

2. The manufacturing method according to claim 1, wherein before the first step of selectively melting the layer of powder material, the substrate is subjected to a surface treatment.

3. The manufacturing method according to claim 2, wherein the surface treatment consists in an ion implantation operation, a plasma treatment or a physical vapour deposition treatment.

4. The manufacturing method according to claim 1, wherein the substrate is preheated prior to the step of selectively melting the layer of powder material.

5. The manufacturing method according to claim 4, wherein the substrate is preheated to a temperature not exceeding 400° C.

6. The manufacturing method according to claim 1, wherein the thickness of the substrate is at least 100 μm.

7. The manufacturing method according to claim 1, wherein the neutral gas is argon and the volume concentration of oxygen in the manufacturing enclosure is less than 0.5%.

8. The manufacturing method according to claim 1, wherein the ceramic material is selected from the group formed by borosilicate glass, alumina, sapphire, titanium boride, titanium oxide $TiO_2$, titanium carbide, tungsten carbide, silicon nitride, zirconia, emerald, ruby and diamond.

9. The manufacturing method according to claim 1, wherein the metallic material is selected from the group formed of aluminium, steel, platinum, gold, silver, palladium, zirconium and titanium.

10. The manufacturing method according to claim 9, wherein a 6061 aluminium powder is used, the particles of which have a diameter comprised between 5 and 63 μm.

11. The manufacturing method according to claim 9, wherein an 18 karat 750 thousandths gold powder is used, the particles of which have a diameter comprised between 5 and 45 μm.

12. The manufacturing method according to claim 10, wherein the powders of materials used are of the D10-D90 type, that is to say that 90% of the particles which form these powders have a diameter of less than 63 μm, and 10% of these particles have a diameter of less than 5 μm.

13. The manufacturing method according to claim 11, wherein the powders of materials used are of the D10-D90 type, that is to say that 90% of the particles which form these powders have a diameter of less than 63 μm, and 10% of these particles have a diameter of less than 5 μm.

14. The manufacturing method according to claim 1, wherein the thickness of a layer of material deposited on the substrate is comprised between 10 μm and 50 μm.

15. The manufacturing method according to claim 14, wherein the number of layers of material deposited on the substrate is comprised between 10 and 20.

16. The manufacturing method according to claim 8, wherein the power of the laser beam is set at a working value comprised between 10 and 35 Watts and in that its speed of movement on the surface of the substrate is comprised between 100 and 700 mm/s.

17. The manufacturing method according to claim 16, wherein the laser beam is of the Yb:YAG type.

18. The manufacturing method according to claim 8, wherein the 2-dimensional stratum of the desired mechanical part has a contour which delimits at least one surface.

19. A mechanical part with technical and/or decorative function, this mechanical part comprising a substrate made of a ceramic material and a structure made of a metallic material and formed on the substrate by laser additive manufacturing according to claim 1.

* * * * *